United States Patent
Bauer et al.

(10) Patent No.: US 8,223,038 B2
(45) Date of Patent: Jul. 17, 2012

(54) DRIVER ASSISTANCE SYSTEM FOR TRAFFIC SIGN RECOGNITION

(75) Inventors: Jochen Bauer, Lindau (DE); Jan Giebel, Sigmarszell (DE)

(73) Assignee: Continental Automotive GmbH, Hannover (DE)

( * ) Notice: Subject to any disclaimer, the term of this patent is extended or adjusted under 35 U.S.C. 154(b) by 538 days.

(21) Appl. No.: 12/522,177

(22) PCT Filed: Dec. 28, 2007

(86) PCT No.: PCT/EP2007/064626
§ 371 (c)(1),
(2), (4) Date: Aug. 5, 2009

(87) PCT Pub. No.: WO2008/080976
PCT Pub. Date: Jul. 10, 2008

(65) Prior Publication Data
US 2010/0141476 A1    Jun. 10, 2010

(30) Foreign Application Priority Data
Jan. 4, 2007  (DE) .......................... 10 2007 001 099

(51) Int. Cl.
*G08G 1/09* (2006.01)
(52) U.S. Cl. ....................................... 340/905; 382/104
(58) Field of Classification Search .................. 340/905, 340/937; 382/104, 224; 701/117
See application file for complete search history.

(56) References Cited

U.S. PATENT DOCUMENTS

| | | | |
|---|---|---|---|
| 6,472,977 B1 * | 10/2002 | Pochmuller | 340/937 |
| 6,801,638 B1 * | 10/2004 | Janssen et al. | 382/104 |
| 7,058,206 B1 | 6/2006 | Janssen et al. | |
| 2004/0010352 A1 | 1/2004 | Stromme | |
| 2006/0034484 A1 | 2/2006 | Bahlmann et al. | |

FOREIGN PATENT DOCUMENTS

| | | |
|---|---|---|
| DE | 19852631 A1 | 5/2000 |
| DE | 10053315 A1 | 5/2002 |
| DE | 10318499 A1 | 11/2004 |

OTHER PUBLICATIONS

Ryuen et al., "Recognition of Circular Road Signs", The Institute of Image Information and Television Engineers, Feb. 4, 2000, vol. 24, No. 11, pp. 17-22, 2000—English abstract.
Hsu et al., "Road sign detection and recognition using matching pursuit method", Image and Vision Computing vol. 19, No. 3, Jan. 1, 2001, pp. 119-129, XP002465759.

* cited by examiner

*Primary Examiner* — John A Tweel, Jr.
(74) *Attorney, Agent, or Firm* — Laurence A. Greenberg; Werner H. Stemer; Ralph E. Locher

(57) ABSTRACT

An evaluation device for a driver assistance system for a vehicle includes an input for receiving image information recorded by a camera, a first component for locating an image section present in a predefined shape in first image information received from the camera, and a second component for requesting second image information. The second image information corresponds to a renewed image of an image section found by the first component, with improved contrast in relation to the first image information. A third component is present for identifying a traffic sign in the second image information, and an output for emitting a signal relating to a traffic sign identified by the third component. There is also provided a computer program product and a method for operating a driver assistance system.

13 Claims, 1 Drawing Sheet

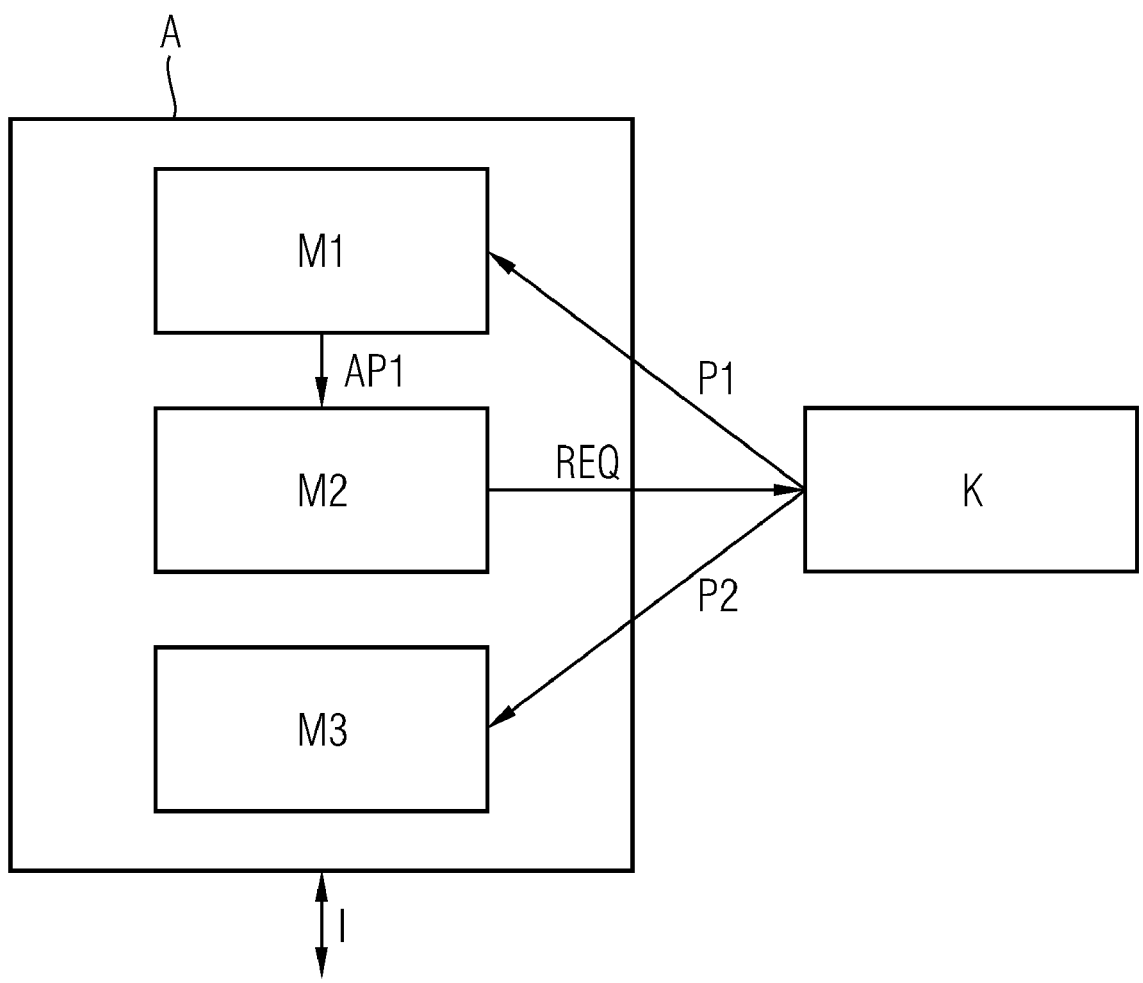

DRIVER ASSISTANCE SYSTEM FOR TRAFFIC SIGN RECOGNITION

BACKGROUND OF THE INVENTION

Field of the Invention

The invention relates to an evaluation facility for a driver assistance system for a vehicle with an input for receiving image information recorded by a camera.

The term driver assistance systems or advanced driver assistance systems (ADAS) covers functions, which serve to assist the driver of a motor vehicle. The objective of driver assistance systems is frequently to improve safety by avoiding dangerous situations before they arise and by helping the driver to avoid accidents in critical situations. Further objectives are to increase comfort levels by reducing stress and easing the pressure on the driver in standard situations, to facilitate orientation by means of situation-based information about the surroundings mediated in a manner appropriate to the driver and to increase driving pleasure.

Examples of driver assistance functions are traction control such as ABS (anti-lock braking system), ASR (German acronym for traction control), ESP (electronic stability program), EDS (electronic differential lock) as well as adaptive cornering light, full-beam and dipping assistance for headlights, night vision systems, cruise control, parking assistance, braking assistance, ACC (adaptive cruise control) or intelligent cruise control, distance warning devices, blind spot assistance, jam assistance, lane recognition systems, lane keeping assistance, lane keeping support, lane changing assistance, ISA (intelligent speed adaptation), AEB (automatic emergency braking), tire pressure control systems, driver state recognition, traffic sign recognition, platooning.

Sensor systems directed toward the drive environment of a motor vehicle are used for many driver assistance functions. This is the case for example for lane recognition or monitoring applications, night vision applications, obstruction warning systems, pre-crash sensing, automatic speed adjustment, jam assistance, pedestrian and bicycle rider protection, traffic sign recognition, parking assistance, etc.

BRIEF SUMMARY OF THE INVENTION

The object of the invention is to demonstrate an efficient evaluation facility for a driver assistance system, as well as a corresponding computer program product and a method for operating a driver assistance system.

This object is achieved by an evaluation facility with the features of claim 1 and by a computer program product and a method with the features of independent claims. Advantageous embodiments and developments are the subject matter of subclaims.

The inventive evaluation facility for a driver assistance system for a vehicle has an input for receiving image information recorded by a camera. A first component is also present for locating an image segment containing a predetermined shape in first image information received from the camera, as is a second component for requesting second image information, the second image information corresponding to a new recording of an image segment located by the first component with better contrast than the first image information, and also a third component for identifying a traffic sign in the second image information. An output is also provided for outputting a signal relating to a traffic sign identified by the third component.

At the start the evaluation facility evaluates the first image information. A predetermined shape is sought in this process. The predetermined shape preferably corresponds to the shape of a specific type of traffic sign, which is of interest to the driver assistance system. If this predetermined shape is located in the first image information, second image information is requested. To obtain the second image information, the image segment containing the predetermined shape is to be recorded again by the camera. The second image information differs from the first image information in that the contrast of the image segment is better.

It is also possible for the second image information to differ in image size from the first image information. The second image information is then preferably restricted in respect of image size to the previously located image segment(s) containing the predetermined shape and therefore does not comprise the entire image, unlike the first image information.

Alternatively it is possible for the second image information not to be restricted to the image segment, so that the image size of the second image information is greater than the image segment in that it is the same size as the image of the first image information. In this instance the improved contrast is preferably restricted to the image segment, so that the contrast outside the image segment is identical for the first and second image information.

The second image information is examined by the evaluation facility to determine whether a traffic sign can be identified. Identification of a traffic sign is easier with the second image information than with the first, as the contrast is higher and therefore the appearance or content of the traffic sign can be viewed more precisely. One or more specific traffic signs are preferably known to the evaluation facility and a decision is made as part of the identification whether a traffic sign is present and, if so, which traffic sign.

In one embodiment of the invention the predetermined shape is a circle. This is particularly advantageous, if the traffic sign identified is a speed limit traffic sign. When a specific speed limit traffic sign is identified, the currently permissible maximum speed is known. This knowledge can be used in that the output signal indicates the maximum speed or initiates measures to adjust speed.

According to one development of the invention the second image information corresponds to a new recording of a located image segment with a modified exposure time compared with the first image information. Modification of the exposure time is a measure to improve the contrast. The exposure time can in particular be lengthened for this purpose. Alternatively or additionally one or more of the following procedures is possible to increase the contrast: use of a different offset value, use of a modified amplification, use of different HDR parameters. The evaluation facility preferably predetermines the manner in which the contrast is to be increased for the camera. Alternatively it is possible for the evaluation facility simply to indicate that a specific image segment is to be recorded with higher contrast, with the camera or a facility controlling the camera deciding the manner of obtaining the second image information in which the contrast is to be increased compared with the first image information.

In one embodiment of the invention the first image information has the same image depth as the second image information. The image depth is then a non-variable parameter of the camera, so that other parameters have to be modified to increase the contrast.

In one development of the invention the signal is a signal perceptible to the driver of the vehicle, e.g. an acoustic, visual or haptic signal. Alternatively or additionally the signal can be a signal that brings about an automatic reduction of the speed of the vehicle. This automatic speed reduction takes place without assistance from the driver.

The inventive computer program product for a driver assistance system for a vehicle comprises means for locating an image segment containing a predetermined shape in first image information, means for requesting second image information, the second image information corresponding to a new recording of a located image segment with better contrast than the first image information, means for identifying a traffic sign in the second image information and means for outputting a signal relating to an identified traffic sign.

In the context of the present invention a computer program product can refer not only to the actual computer program (with its technical effect going beyond the normal physical interaction between program and computation unit) but also in particular a recording carrier for the computer program, a file collection, a configured computation unit and also a storage apparatus or server for example, on which files belonging to the computer program are stored.

With the inventive method for operating a driver assistance system for a vehicle an image segment containing a predetermined shape is located in first image information; second image information is then requested, the second image information corresponding to a new recording of a located image segment with better contrast than the first information; a traffic sign is identified in the second image information and a signal relating to an identified traffic sign is output.

The inventive computer program product and the inventive method are particularly suitable for the inventive evaluation facility and this can also apply to the embodiments and developments. They can comprise further suitable means and/or steps for this purpose.

BRIEF DESCRIPTION OF THE DRAWING

The invention is described in more detail below with reference to an exemplary embodiment, in which:

FIG. 1 shows a segment of a driver assistance system of a motor vehicle.

DESCRIPTION OF THE INVENTION

The invention is described with reference to the driver assistance system function TSR (traffic sign recognition). TSR is used to avoid speed excesses. In a strange environment in particular a speed restriction can easily be missed due to traffic and sign density, resulting in unintended dangerous driving at excessive speed. For this reason the driver assistance system function TSR recognizes speed limit traffic signs.

The driver assistance system in FIG. 1 comprises a video camera K, e.g. a CMOS camera, which records the environment in front of the motor vehicle. To this end the camera K is preferably positioned in proximity to the rearview mirror and captures the region in front of the moving motor vehicle. The information provided by the camera K is supplied to the evaluation unit A, preferably an on-board computer. The images supplied to the evaluation unit A by the camera K consist of one gray-scale value respectively for each pixel of the images.

The evaluation unit A searches for speed limit traffic signs. Coordination with information from the navigation system is also possible here. When a speed limit is recognized by the evaluation unit A, it can be shown to the driver on the tachometer or in a head-up display for example. The evaluation unit A has a human-machine interface I for informing the driver in this manner. As an alternative or in addition to the human-machine interface I an interface can be provided for autonomous control of the vehicle. Actions can be applied to the vehicle by way of an interface for autonomous control of the vehicle—e.g. by braking or accelerating—without assistance from the driver. This allows automatic intervention for deceleration. The cruise controller can also be controlled by way of an interface for autonomous control of the vehicle, so that the cruise controller parameters can be tailored to the current maximum speed in each instance.

Cameras with a bit depth or image depth of 8 bits per pixel are generally used for driver assistance systems. The number of bits here corresponds to the number of possible brightness values for a pixel. With an image depth of 8 bits for example $2^8$ gray tones are available for each pixel. The greater the image depth, the higher the contrast of the recorded image. It is assumed that the camera K only has a low image depth, for example 8 bits. This reduces the price of the camera K required for the driver assistance system; it also takes account of the limited computation capacity of the system.

The brightness of a traffic sign often differs very significantly from its surroundings. For example when the sun shines from the rear, a round traffic sign appears as a white disk; if the sun faces the direction of travel, a round traffic sign appears as a dark disk. The low image depth of the camera K means that in such situations a traffic sign cannot be clearly identified, as the contrast within the disks is too low.

In order to be able to recognize a traffic sign reliably despite the low image depth of the camera K, the following procedure is followed: the camera K transmits the images P1 it captures to the evaluation unit A. A suitable algorithm is used in the component M1 of the evaluation unit A to search for image segments, in which a traffic sign is probably located. For this purpose the knowledge is utilized that speed limit traffic signs have a specific shape. The criterion for deciding whether an image region probably contains a speed limit traffic sign and is therefore examined further as described below is thus a shape. In Germany for example speed limit traffic signs are round in shape; in the US they are rectangular. The Hough transformation or template matching for example can be used here as algorithms for recognizing a predetermined shape. These algorithms are described for example in Bernd Jähne: "Digitale Bildverarbeitung" (Digital image processing), Springer Verlag 1997.

The component M1 informs the component M2 of the evaluation unit A of the located image regions AP1. These image regions AP1 respectively contain the predetermined shape of the speed limit traffic sign. The size of the image regions AP1 either corresponds to the recognized shape or is greater than this. If the shape is a circle, the respective image region AP1 can thus be a circle of the same size or for example a rectangle, within which the recognized circle is located.

The image regions AP1 are then examined further as ROI (Regions of Interest) to determine whether they contain speed limit traffic signs. To this end the component M2 of the camera K sends an instruction REQ to record the image regions AP1 with a higher contrast than the images P1. One or more of the following measures can be applied to record the image regions AP1 with higher contrast:

Modifying the exposure time.

Using an offset or black balance, optionally increased compared with the recording of the images P1. In this process constant values are added to the gray-scale values or brightness or intensity value of each individual image point.

Using or modifying an amplification. The voltage values of the individual pixels are multiplied in each instance here by an identical value for all pixels.

Setting parameters of a non-linear characteristic curve of the HDR (High Dynamic Range) technology, preferably adjusting inflexion points and pitch ratios. With HDR the generally linear characteristic curve for the mapping of light in gray-scale values is replaced by a partially linear characteristic curve, with the portion for higher brightness values being flatter than the portion for lower brightness. Parameters of the HDR characteristic curve are the position of the inflexion points and the ratio of the pitches of the respective linear segments. HDR is described for example in http://www.photonfocus.com/html./de/cmos/linlog.php.

The higher-contrast recording of the images is effected quickly, so that the image regions AP1 can be captured repeatedly, before they are no longer visible to the camera K because of the onward movement of the vehicle. The camera K transmits the images P2 recorded with higher contrast to the component M3 of the evaluation unit A. The component M3 checks the images P2 to determine whether they contain speed limit traffic signs. The decision whether a speed limit traffic sign is present can be made for example using a traffic sign database, in which information about the appearance of traffic signs of relevance to the driver assistance system is stored. If the component M3 decides that a speed limit traffic sign is present, corresponding information is issued to the driver by way of the interface I.

The described procedure has the advantage that only a small computation requirement is necessary compared with the alternative, according to which the entire image is recorded with a high image depth. The contrast is only optimized for those regions of relevance for TSR. This allows the required image depth or dynamic scope to be reduced.

Examination of the image regions AP1 recognized on the basis of their shape with better contrast allows reliable recognition of traffic signs, thereby increasing the reliability and therefore the safeness and acceptance of the driver assistance system.

Although the invention was described with reference to speed limit traffic signs, it can also be applied to other types of traffic sign and also to objects other than traffic signs.

The invention claimed is:

1. An evaluation device for a driver assistance system for a vehicle, comprising:
   an input for receiving image information recorded by a camera;
   a first component for locating an image segment containing a predetermined shape in first image information received from the camera;
   a second component configured to send to the camera an instruction to record the image segment with a higher contrast relative to the first image information and to request second image information, wherein the second image information corresponds to a new recording of the image segment located by said first component with better contrast than the first image information;
   a third component configured to receive the second image information and to identify a traffic sign in the second image information; and
   an output for outputting a signal relating to the traffic sign identified by the third component.

2. The evaluation device according to claim 1, wherein the predetermined shape is a circle.

3. The evaluation device according to claim 1, wherein the traffic sign is a speed limit traffic sign.

4. The evaluation device according to claim 1, wherein the second image information corresponds to a new recording of a located image segment with a modified exposure time compared with the first image information.

5. The evaluation device according to claim 1, wherein the second image information corresponds to a new recording of a located image segment with a different offset value from the first image information by adding constant values to the individual image points.

6. The evaluation device according to claim 1, wherein the second image information corresponds to a new recording of a located image segment with modified amplification compared with the first image information.

7. The evaluation device according to claim 1, wherein the second image information corresponds to a new recording of a located image segment with different High Dynamic Range parameters from the first image information.

8. The evaluation device according to claim 1, wherein the first image information and the second image information have a common image depth.

9. The evaluation device according to claim 1, wherein the signal relating to the traffic sign is a signal perceptible to a driver of the vehicle.

10. The evaluation device according to claim 1, wherein the signal relating to the traffic sign is a signal that brings about an automatic reduction of a speed of the vehicle.

11. A driver assistance system for a vehicle, comprising: an evaluation device according to claim 1 and the camera connected to said evaluation device.

12. A computer program product for a vehicle assistance system for a vehicle, comprising computer-readable instructions stored in memory and being executable to:
   locate an image segment containing a predetermined shape in first image information received from a camera;
   send an instruction to the camera to re-record the image segment with a higher contrast than the images in the first image information and to request second image information, the second image information corresponding to a new recording of a located image segment with better contrast than the first image information;
   identify a traffic sign in the second image information; and
   output a signal relating to a traffic sign thus identified.

13. A method for operating a driver assistance system for a vehicle, the method which comprises:
   locating an image segment containing a predetermined shape in first image information;
   sending instructions to the camera to record the image regions with a higher contrast than the images and requesting second image information, the second image information corresponding to a new recording of a located image segment with better contrast than the first image information;
   identifying a traffic sign in the second image information; and
   outputting a signal relating to an identified traffic sign.

* * * * *